US012656268B2

(12) United States Patent
Lincoln et al.

(10) Patent No.: US 12,656,268 B2
(45) Date of Patent: Jun. 16, 2026

(54) OPTICAL TURBINE ENGINE BLADE DAMAGE DETECTOR

(71) Applicant: Raytheon Technologies Corporation, Farmington, CT (US)

(72) Inventors: David L. Lincoln, Cromwell, CT (US); Paul Attridge, Colchester, CT (US)

(73) Assignee: RTX Corporation, Farmington, CT (US)

( * ) Notice: Subject to any disclaimer, the term of this patent is extended or adjusted under 35 U.S.C. 154(b) by 1003 days.

(21) Appl. No.: 17/456,238

(22) Filed: Nov. 23, 2021

(65) Prior Publication Data

US 2023/0160834 A1 May 25, 2023

(51) Int. Cl.
*G01N 21/89* (2006.01)
*F01D 21/00* (2006.01)
*G01N 21/47* (2006.01)

(52) U.S. Cl.
CPC ....... *G01N 21/8914* (2013.01); *F01D 21/003* (2013.01); *G01N 21/4738* (2013.01); *F05D 2270/804* (2013.01); *G01N 2021/4707* (2013.01); *G01N 2021/4709* (2013.01)

(58) Field of Classification Search
CPC ........... G01N 21/8914; G01N 21/4738; G01N 2021/4707; G01N 2021/4709; F01D 21/003; F05D 2270/804; G01M 5/0033; G01M 5/0091; G01M 11/081; G01M 5/0016
See application file for complete search history.

(56) References Cited

U.S. PATENT DOCUMENTS

| | | | | |
|---|---|---|---|---|
| 4,060,329 | A | * | 11/1977 | Ellis ........................ G01M 9/06 356/614 |
| 4,770,712 | A | * | 9/1988 | Hopkins ................. B60S 3/045 15/236.1 |
| 6,499,350 | B1 | | 12/2002 | Board et al. |
| 7,221,445 | B2 | | 5/2007 | Earthman et al. |
| 7,301,165 | B2 | | 11/2007 | Hu et al. |
| 9,037,381 | B2 | | 5/2015 | Care |
| 9,046,000 | B2 | | 6/2015 | Kominsky |
| 9,950,815 | B2 | | 4/2018 | Finn et al. |
| 10,473,593 | B1 | | 11/2019 | Xiong et al. |

(Continued)

FOREIGN PATENT DOCUMENTS

| | | | |
|---|---|---|---|
| EP | 3683410 | A2 | 7/2020 |
| WO | 2012003372 | A2 | 1/2012 |

OTHER PUBLICATIONS https://vtchl.illinois.edu/facilities/experimental-facilities/3-d-laser-doppler-velocimetry-ldv-system/.*
Extended European Search Report for EP Application No. 22209226.4, Dated Apr. 25, 2023, pp. 5.

*Primary Examiner* — Mohamed K Amara
(74) *Attorney, Agent, or Firm* — Kinney & Lange, P.A.

(57) ABSTRACT

A damage detection system includes one or more emitters, one or more receivers, and a controller. Emitters are arranged to transmit continuous beam or intermittent light pulses toward rotor blades during operation of a turbomachine. Light returns collected at the receivers define a light return amplitude profile. The controller analyzes the light return amplitude profile to identify light amplitude changes indicative of one or more damaged blades. When the light return profile satisfies one or more damage criteria, the controller outputs an indication of blade damage to another turbomachine controller, system, or display.

18 Claims, 4 Drawing Sheets

(56) References Cited

U.S. PATENT DOCUMENTS

| | | | |
|---|---|---|---|
| 10,759,543 | B1 | 9/2020 | Haye |
| 10,767,507 | B2 | 9/2020 | Khibnik et al. |
| 10,914,191 | B2 | 2/2021 | Finn et al. |
| 10,958,843 | B2 | 3/2021 | Xiong et al. |
| 11,255,219 | B2 * | 2/2022 | Schleif ..................... G07C 3/00 |
| 2002/0162394 | A1 * | 11/2002 | Loftus ................... G01H 1/006 |
| | | | 73/660 |
| 2008/0088824 | A1 * | 4/2008 | McMillan .............. G01N 25/72 |
| | | | 356/51 |
| 2009/0177433 | A1 * | 7/2009 | Palmer ..................... G01P 3/49 |
| | | | 702/145 |
| 2010/0168981 | A1 * | 7/2010 | Kominsky ............ G01B 11/14 |
| | | | 701/100 |
| 2010/0177299 | A1 * | 7/2010 | Kominsky ............ G01B 11/14 |
| | | | 356/5.01 |
| 2010/0195100 | A9 * | 8/2010 | Caldwell ................ G01S 17/87 |
| | | | 356/341 |
| 2010/0209248 | A1 * | 8/2010 | Volanthen ........... G01M 5/0016 |
| | | | 416/61 |

| | | | |
|---|---|---|---|
| 2013/0003071 | A1 * | 1/2013 | Mamidipudi ............ G01P 5/26 |
| | | | 356/28 |
| 2013/0114066 | A1 | 5/2013 | Mamidipudi et al. |
| 2014/0023498 | A1 * | 1/2014 | Kominsky .............. F01D 17/02 |
| | | | 416/61 |
| 2015/0083919 | A1 * | 3/2015 | Wind .................... F01D 21/003 |
| | | | 250/341.2 |
| 2016/0177771 | A1 * | 6/2016 | Hatcher, Jr. .......... F01D 21/003 |
| | | | 415/118 |
| 2017/0268963 | A1 | 9/2017 | Conner et al. |
| 2018/0284758 | A1 * | 10/2018 | Cella ...................... G06Q 50/00 |
| 2018/0340441 | A1 * | 11/2018 | Miyamoto ............ G01B 11/14 |
| 2019/0195084 | A1 * | 6/2019 | Lipstein ................ G01B 11/27 |
| 2019/0339165 | A1 | 11/2019 | Finn et al. |
| 2019/0376410 | A1 * | 12/2019 | Schleif ................. F01D 21/003 |
| 2022/0090582 | A1 * | 3/2022 | Boyd ................... F01D 21/003 |
| 2024/0060423 | A1 * | 2/2024 | Black ................... F01D 11/122 |
| 2025/0198892 | A1 * | 6/2025 | Bennani Kemmoun .................... G01M 5/0075 |

* cited by examiner

OPTICAL TURBINE ENGINE BLADE DAMAGE DETECTOR

BACKGROUND

The present disclosure relates to a turbomachine and, more particularly, to a damage detection system and algorithm configured to inspect a rotor of the turbomachine during operation.

Damage or wear of turbomachinery rotors are substantial contributors to the performance and operational life of the turbomachine. Aircraft engines are turbomachines that can be damaged by foreign object debris or FOD. Large objects, for example a large bird strike, can cause significant changes that can be detected by monitoring systems, such as shaft vibration. Smaller objects can cause damage that can be difficult to detect visually. Regular inspection is performed to determine if any such damage has occurred such that maintenance can be performed.

SUMMARY

A damage detection system, in accordance with an exemplary embodiment of this disclosure, includes an emitter, a receiver, and a controller. The emitter has an orientation to emit a plurality of light pulses along an emission axis intersecting a plurality of blades of a turbomachine rotor. The receiver has a first field of view intersecting the emission axis to define a first interrogation volume through which the plurality of blades rotates during operation of the turbomachine. The controller includes a processor and computer-readable memory encoded with instructions that, when executed by the processor, cause the system to emit the plurality of light pulses from the emitter toward the plurality of blades as the blades rotate within the turbomachine. The system collects, at the receiver, a plurality of light returns scattered by the plurality of blades within the interrogation volume. The controller determines an amplitude change of the first light returns and outputs an indication of damages based on the amplitude change detected within the light returns.

DETAILED DESCRIPTION

As disclosed herein, a damage control system for a turbomachine includes one or more emitters, one or more receivers, and a controller. During operation of the turbomachine, rotor blades pass through an interrogation volume defined about an intersection of an emitter and receiver field of view. Emitters transmit visible and/or infrared light using a continuous beam or intermittent pulses, and receivers collect back scatter, forward scatter, and/or side scatter light returns. Light returns collected over a period of time define one or more light return amplitude profiles, which are analyzed for light amplitude changes. The controller compares light amplitude changes to one or more damage criteria and output an indication of blade damage when the light amplitude change satisfies the damage detection criteria. Accordingly, the damage detection system monitors a turbomachine rotor in situ and during operation of the turbomachine to identify blade damage that would otherwise be undetected by analyzing primary turbomachine parameters such as rotational speed, operational pressures and temperatures, and vibration.

Figure 1:
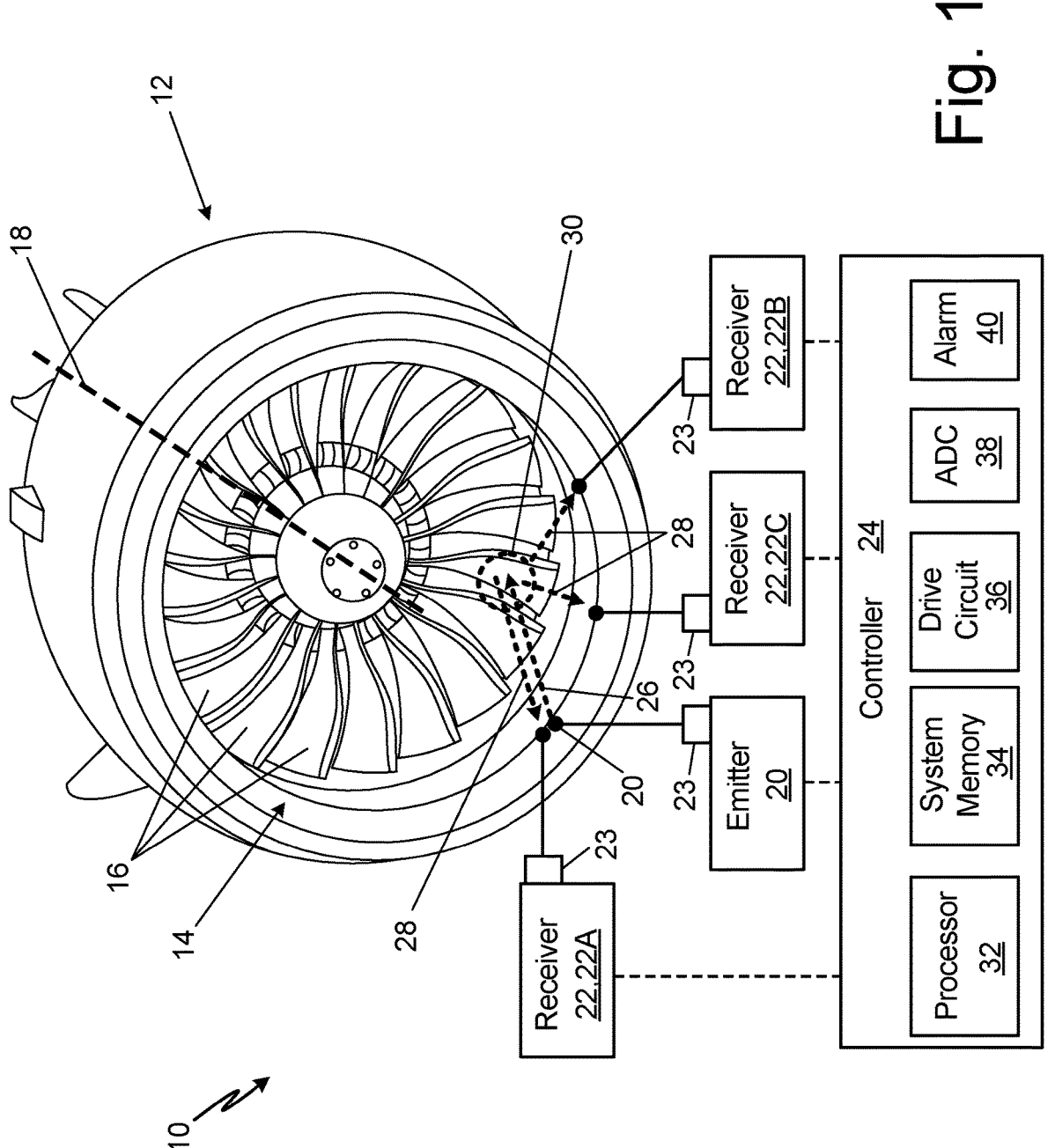
FIG. 1 and FIG. 2 are schematic representations of exemplary damage detection systems.
Figure 2:
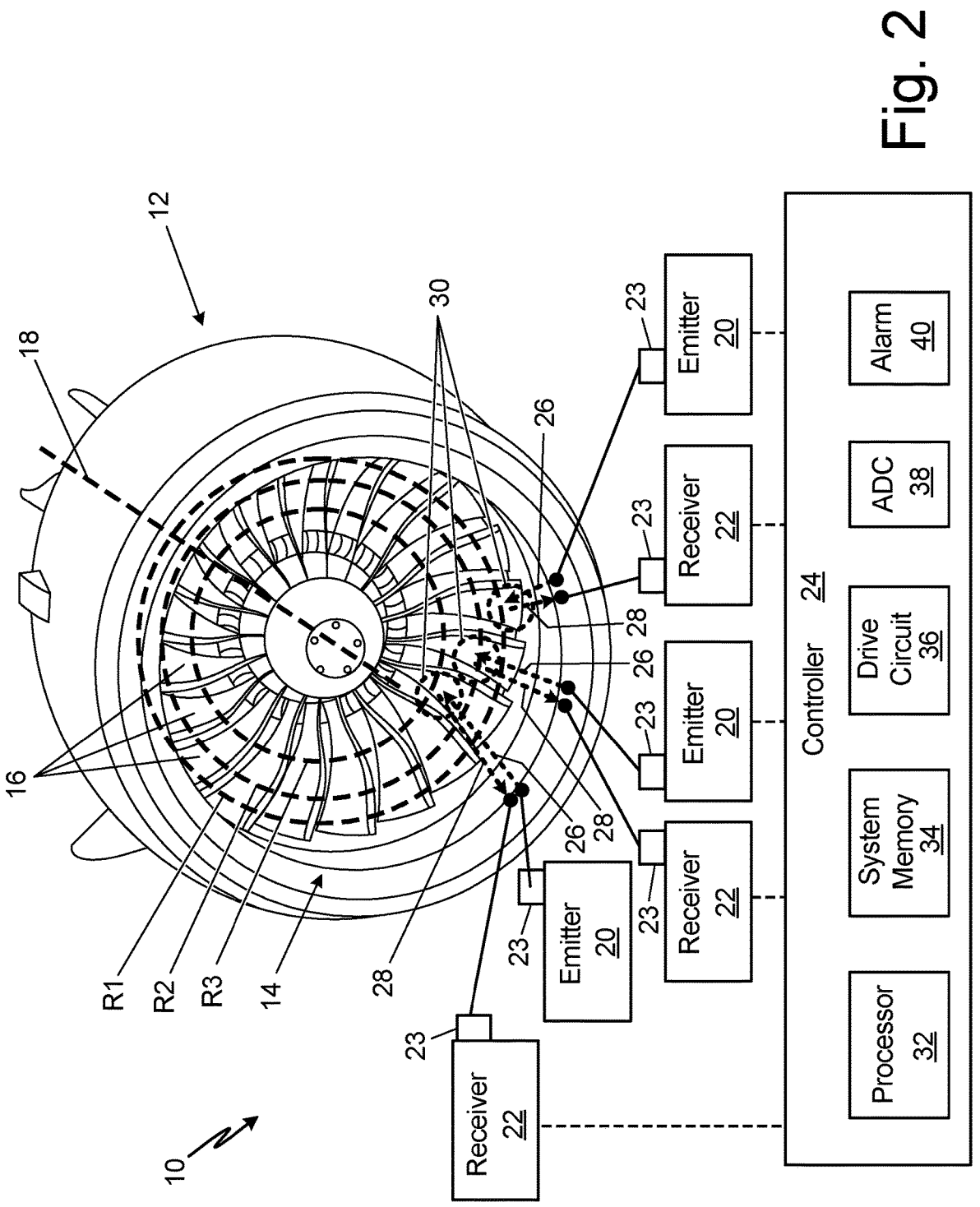

FIG. 1 is a schematic representation of damage detection system 10 installed onto turbomachine 12 to inspect rotor 14, which includes multiple blades 16 arranged circumferentially about rotational axis 18. Damage detection system 10 includes at least one emitter 20, at least one receiver 22, and controller 24. Emitter 20 and receiver 22 are mounted to turbomachine 12 within a field of view of rotor 14 and arranged such that emitter line of sight 26 (or emission axis) intersects receiver line of sight 28 to define interrogation volume 30 about the intersection.

As shown, turbomachine 12 is a bypass gas turbine engine for an aircraft and rotor 14 is a fan rotor. However, the technique disclosed herein are applicable to other aircraft engine types, such as turboprop engines and turboshaft engines, as well as non-aircraft applications including industrial gas turbine engines and other turbomachinery.

Receiver 22 can be co-located with emitter 20 or mounted near emitter 16 such that receiver 22 intercepts light scattered in a direction opposite an emission direction (i.e., back scatter). In other arrangements, receiver 22 can be spaced from emitter 20 such that receiver 22 intercepts light scattered in a direction along an emission direction (i.e., forward scatter). When receiver 22 is positioned at right angles to the emission direction, receiver 22 collects light returns scattered at or near right angles to the emission direction (i.e., side scatter). Between back scatter and side scatter locations and between side scatter and forward scatter receiver positions, different proportions of back scatter, forward scatter, and side scatter light returns can be collected by receiver 22. Typically, light returns forming an angle between 135 degrees and 180 degrees with the emission direction are considered to be backscatter. Light returns that form an angle between 45 and 135 degrees relative to the emission direction are classified as side scatter while returns parallel to the emission direction or forming an angle between 0 degrees and 45 degrees of the emission direction are considered forward scatter.

Other factors can affect the proportion of back scatter, side scatter, and forward scatter at a given location such as surface roughness, surface features, discontinuities, and/or other surface topography. Accordingly, while receivers 22 may initially receive predominately back scatter, side scatter, or forward scatter light returns, the type of light returns collected by receiver 22 can change based on a change in surface features. For instance, wear of blades 16 or damage to blades 16 from foreign object debris (FOD) may cause a change to blade topography that produces a commensurate change in back scatter, forward scatter, and/or side scatter amplitude.

In other implementations of damage detection system 10, multiple emitters 20 and/or receivers 22 are used to inspect rotor 14 of turbomachine 12. In one instance, a single emitter 20 can be associated with multiple receivers 22, each receiver 22 arranged to intercept light scattered by rotor 14 that originates from emitter 20. As shown in FIG. 1, receivers 22A, 22B, and 22C are positioned to receive light returns from emitter 20. Receiver 22A is collocated with emitter 20 to receive primarily backscatter light returns. Receiver 22B is positioned along the emission direction to receive forward light scatter returns. Receiver 22C has an intermediate position between receiver 22A and receiver 22B to receive side scatter returns. 5 In yet another embodiment, each independent channel of a multi-channel receiver 22 (or line camera) can interrogate a different radial station of blades 16 in order to collect light returns from a single emitter 20 or multiple emitters 20.

Each emitter 20 of detection system 10 can be, for example, a light emitting diode (LED) or a visible and/or infrared laser. Accordingly, light produced by emitters 20 can be incoherent or coherent. Receivers 22 are photoelectric sensors that detect light amplitude scattered by a target (e.g., blade 16) and output a signal representative of the collected light amplitude. In some embodiments, receivers 22 can be avalanche photo-diodes (APD) and/or multi-channel photon counters (MPPC). Additionally, receivers 22 can be used in conjunction with emitters 20 to determine a time of flight of light collected at receivers 22. Further, emitters 20 can transmit light continuously or intermittently as light pulses. Where emitters 20 produce light pulses, the light pulse frequency can be varied to increase or decrease inspection resolution as necessary for the particular application. For example, shorter light pulses illuminate a smaller area of blade 16 when blades 16 are rotating at speed, which can increase sensitivity for smaller surface features of blades 16. Further, shorter light pulses allow receivers 22 to attain higher sampling rates, if desired. Applied to rotor 14 of turbomachine 12 in operation, the light pulse frequency can be at least a multiple of a product equal to a rotational speed of rotor 14 times a number of blades 16 assembled onto rotor 14 in order to ensure multiple observations of each blade 16. In other embodiments, the light pulse frequency of one or more emitters 20 can be less than the rotational speed of rotor 14 times a number of blades 16. In such embodiments, controller 24 synchronizes the emitter light pulses to a rotational position of blades 16 based on a signal provided by a rotational position sensor or derived from a rotational speed sensor. Accordingly, each light pulse illuminates one or more target locations of blades 16, even though rotor 14 may complete multiple rotations between samples.

In any of the foregoing examples, emitters 20 and/or receivers 22 can be mounted directly to or flush with a surface of turbomachine 12. In other instances, one or more of emitters 20 and receivers 22 are mounted to turbomachine 12 remote from the surface, light pulses and light returns traversing between emitter 20 and/or receiver 22 via a fiber optic cable. Fiber optic cables can be bifurcated, containing two or more discrete fiber optic paths such that a single cable can be shared between an emitter and receiver, between multiple emitters, or between multiple receivers. Further, any of the foregoing examples can include lens 23 to focus and/or filter light transmitted by emitters 20 or to collect and filter light intercepted by receivers 22.

Controller 24 includes one or more processors 32 and system memory 34 that stores damage detection routine for inspecting blades of a turbomachine rotor to determine the presence of blade damage due to wear and/or foreign object debris (FOD) damage. Processor 32 executes damage detection algorithm as described in further detail below. Examples of processor 32 can include any one or more of a microprocessor, a controller, a digital signal processor (DSP), an application specific integrated circuit (ASIC), a field-programmable gate array (FPGA), or other equivalent discrete or integrated logic circuitry. System memory 34 can be configured to store information within controller 24 during operation as well as any inspection criteria necessary for distinguishing damaged regions of blades 16. System memory 34, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). System memory 34 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

In some examples, processor 32 and system memory 34 are collocated in a control unit, which itself can be collocated with other components of damage detection system 10. In other examples, any one or more components and/or described functionality of controller 24 can be distributed among multiple hardware units. For instance, in some examples, controller 24 can be incorporated into an electric engine control (EEC) unit or a full-authority digital engine control (FADEC) to perform functions other than those required by damage detection system 10. In other examples, controller 24 can be a module discrete from other aircraft or engine control modules, which may be collocated with or remote from other aircraft or engine control modules and/or other components of damage detection system 10. In general, though illustrated and described below as an integrated hardware unit, controller 24 can include any combination of devices and components that are electrically, communicatively, or otherwise operatively connected to perform functionality attributed herein to controller 24.

Additionally, controller 24 can include drive circuit 36, analog-to-digital converter (ADC) 38, and alarm 40. Drive circuit 36 is an electrical circuit constructed to regulate the voltage and/or current supplied to emitter 20. Drive circuit 36 can be designed to produce light from one or more emitter 20 at a target frequency. Additionally, the design of drive circuit 36 can facilitate continuous light emissions from emitters 20 or supply intermittent power to emitter 20 such that emitter produces light pulses 20 at the target frequency. In some instances, receivers 22 produce an analog voltage and/or current in proportion to the amplitude of light collected, an analog-to-digital (ADC) converter 38 can be used to convert these analogue signals into digital signals for use by the controller 24. Furthermore, controller 24 can include alarm 40 for outputting a signal indicative of blade damage to another system. For instance, detection systems 10 incorporated into aircraft can output an indication of blade damage to an electric engine controller (EEC), a full authority digital engine controller (FADEC), or another engine and/or aircraft system. Alternatively, alarm 40 can output an indication of blade damage to a display so that an operator can take corrective action.

Figures 3A, 3B:
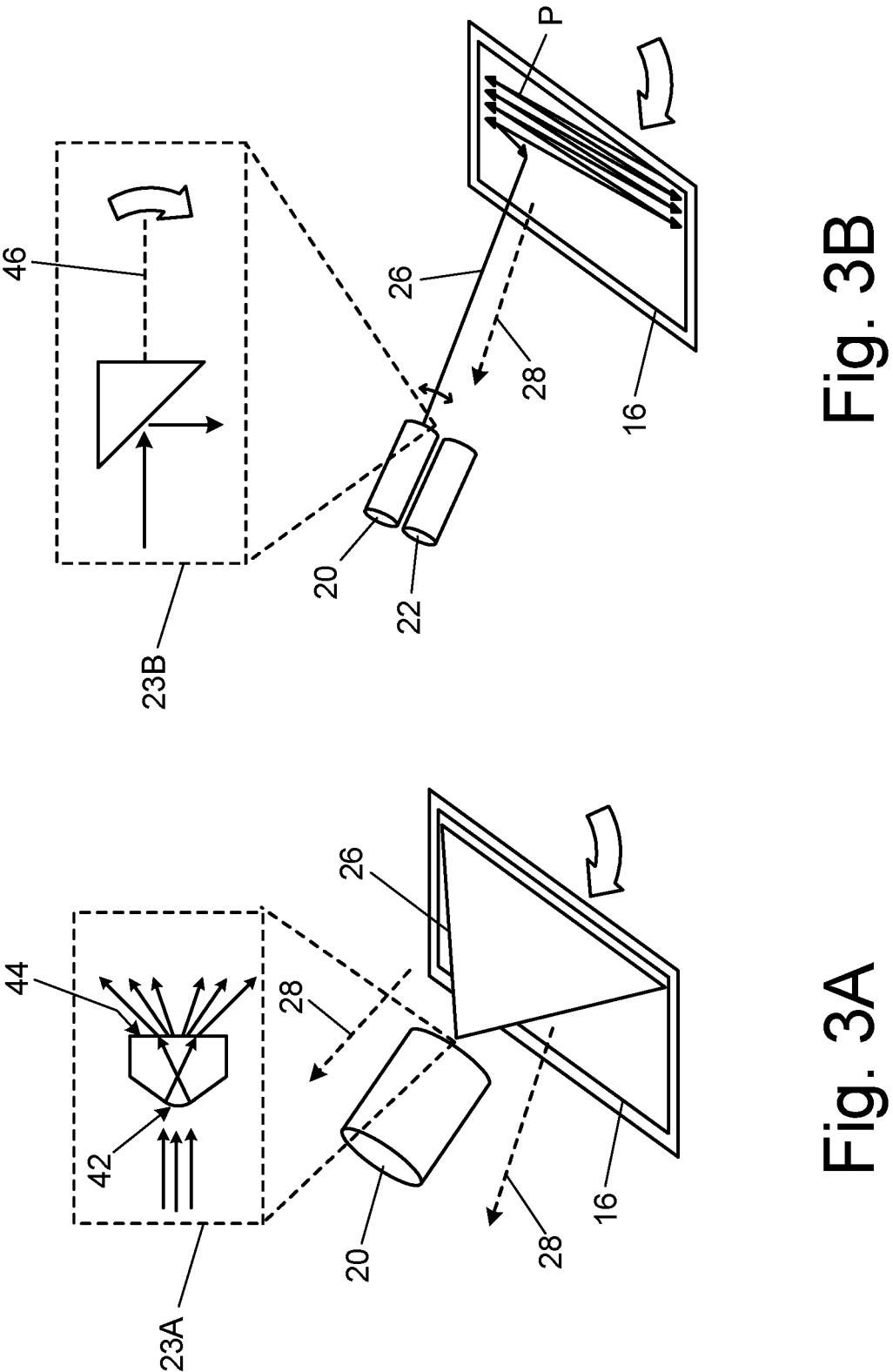
FIG. 3A is an exemplary emitter that incorporates a lens to produce structured light emissions.
FIG. 3B is an exemplary emitter that utilizes a mirror to scan a surface of a blade.

FIG. 3A depicts an exemplary emitter 20 that includes lens 23A for illuminating a line of light along blade 16. Lens 23A includes curved inlet surface 42 and flat outlet surface 44. In an emission direction from inlet surface 42 to outlet surface 44, lens 23A diverges such that a cross-sectional area of outlet surface 44 exceeds a cross-sectional area of inlet surface 42. Light entering inlet surface 42 refracts through lens 23A to produce a fanned light structure emitted from outlet surface 44. This fanned light structure illuminates a line along the surface of blade 16, which can be collected by one or more receivers 22.

FIG. 3B depicts another exemplary embodiment of emitter 20 that includes mirror 23B. Mirror 23B rotates about axis 46 to thereby redirect light produced by emitter 20 to illuminate path P on a surface of blade 16. Receiver 22 collects light scatter from path P for each blade 16 passing through the inspection volume associated with emitter 20 and receiver 22.

Figure 4:
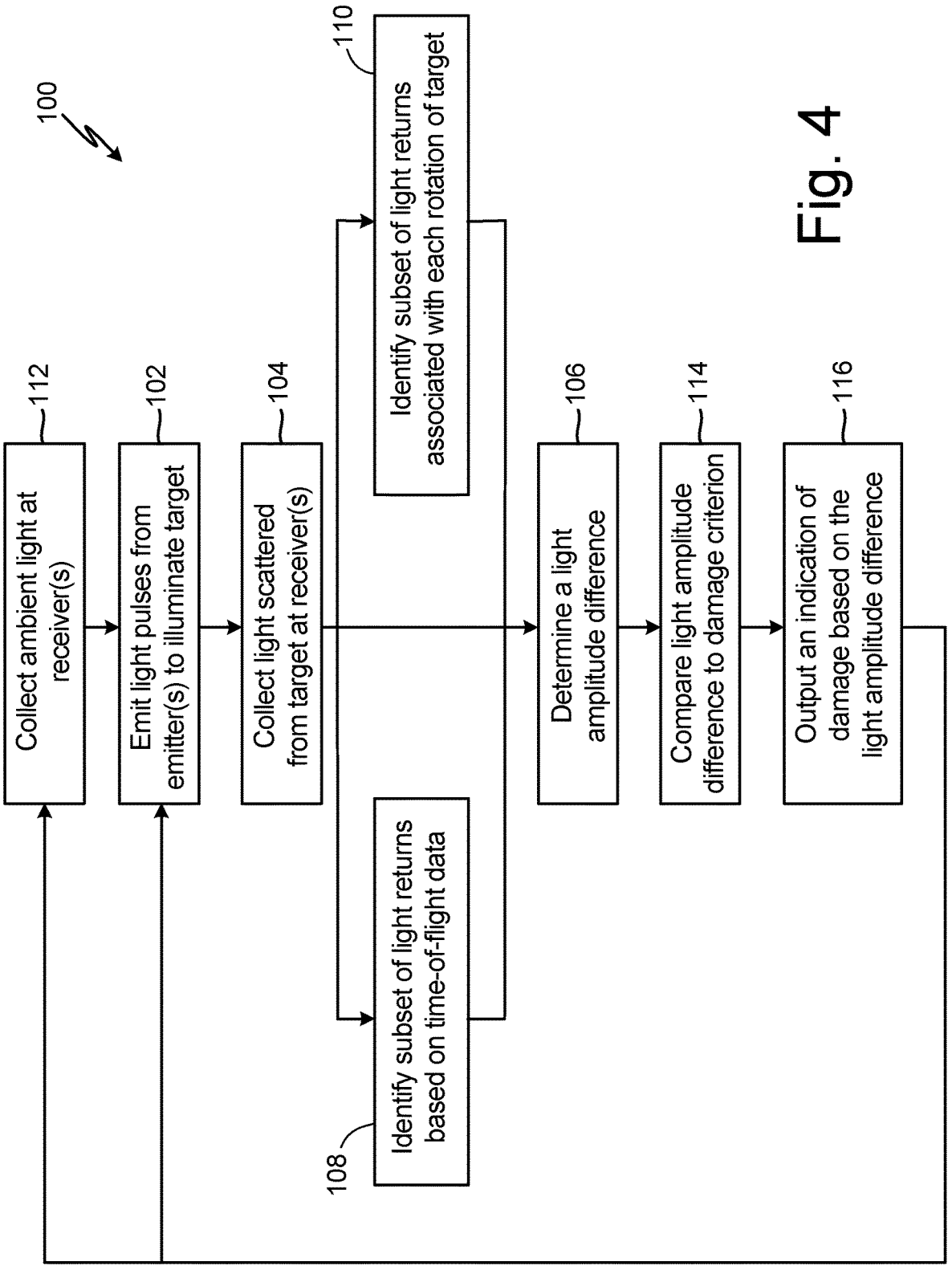
FIG. 4 is a flow chart describing a damage detection algorithm.

FIG. 4 is a flow chart describing damage detection algorithm 100 stored within and executed by controller 24. Damage control algorithm 100 includes steps 102, 104, 106, 108, 110, 112, 114, and 116. The sequence depicted is for illustrative purposes only and is not meant to limit damage detection algorithm 100 in any way as it is understood that the portions of the algorithm can proceed in a different logical order, additional or intervening portions can be included, or described portions of the algorithm can be divided into multiple portions, or described portions of the algorithm can be omitted without detracting from the described above.

In step 102, controller 24 causes each emitter 20 of damage detection system 10 to emit light toward one or more blade 16 during operation of turbomachine 12. Emitted light can be produced continuously to illuminate interrogation volume 30. Alternatively, emitter 20 may produce light intermittently, emitting light pulses at a target frequency and pulse width (or light pulse duration). As discussed above, damage detection system 10 includes at least one emitter, and may include more than one emitter 20 arranged to illuminate the one or more interrogation volume through which blades 16 rotate during operation of turbomachine 12. Where multiple emitters 20 are utilized by damage detection system 10, damage detection algorithm 100 may cause each emitter 20 to produce light simultaneously such that receivers 22 collect light transmitted from each emitter 20. In other embodiments, the proximity and/or configuration of emitters 20 and receivers 22 may benefit by transmitting light from each emitter 20 sequentially such that at any given instant in time, only one or a subset of emitters 20 produces light. Each emitter 20 can illuminate a single spot of blade 16. In other embodiments, emitter 20 can include lens 23, distributing light emissions to thereby illuminate a line of blade 16 as shown in FIG. 3A. In still other embodiments, emitter 20 can scan along path P of blade 16 as shown in FIG. 3B.

Subsequently in step 104, one or more receivers 22 collect light scattered from blade 16. Depending on the relative positions of emitters 20 and receivers 22, receivers 22 can collect predominately back scatter light returns, forward scatter light returns, or side scatter light returns. Upon receiving light return amplitude data from each receiver 22, controller 24 stores light return amplitude data. Steps 102 and 104 repeat for a period of time enabling controller 24 to record light amplitude data as a function of time for each receiver 22 of damage detection system 10. From the light amplitude data, controller 24 determines a light amplitude difference in step 106 by comparing the light return amplitude at different time steps.

Calculating the light amplitude change can be augmented by including one or more of the following steps. For example, the orientation of emitter 20 relative to blades 16, and/or the number and spacing of blades 16 within turbomachine 12, may permit light emissions to pass between adjacent blades 16. However, because the relative distance between emitter 20 and blades 16 as well as the distance between blades 16 and receivers 22 remains fixed, time of flight data can be used to identify a subset of light returns associated with one or more blades 16. Accordingly, in some embodiments, controller 24 determines a time of flight for each light pulse transmitted from emitter 20 and collected by receiver 22 in step 108 by comparing the time step when emitter 20 produces a light pulse and the time step when receiver 22 collects the emitted light pulse. Using this time-of-flight data, controller 24 may exclude light returns having a time of flight greater than a threshold value, indicating a light pulse returning from behind the intended blade inspection region. In other instances, controller 24 can exclude light returns having a time of flight greater than an upper threshold and less than a lower threshold to exclude returns reflected from objects or features of turbomachine 12 in front of the intended target region. For embodiments utilizing multiple emitters 20 to illuminate different radial stations of blades 16, or embodiments utilizing lens 23A to illuminate a linear region of blades 16, time-of-flight data within upper and lower thresholds can be further divided into subranges. Each subrange can be associated with a radial station of blades 16. Using any of the foregoing light return subsets, controller can determine a light amplitude change in step 106.

In another embodiment, controller 24 can identify a subset of light returns associated with each rotation of rotor 14 in step 110. For example, controller 24 can identify a repeating pattern of light amplitude peaks and/or troughs in the light return amplitude signal. In other examples, individual rotations can be identified by counting a predetermined number of peaks and/or troughs, each peak or trough associated with one of blades 16. Alternatively, light returns associated with each rotation can be identified by subdividing the light returns signals accordingly to a time interval calculated as a function of rotational speed. In other embodiments, a first set of light returns are collected during multiple rotations of rotor 14 to establish a baseline light amplitude profile. During subsequent rotations of rotor 14, a light amplitude profile derived from a second set of light returns can be compared to the baseline profile. In each instance, controller 24 may determine a light amplitude difference by comparing light return amplitudes from different sequential or non-sequential rotations in step 106.

Furthermore, the light return amplitude calculation can be improved by first measuring an ambient light level in step 112. In this case, one or more of receivers 22 collect light at a time preceding or between light emissions from emitters 20. Without first emitting a light pulse from emitter 20, the light amplitude determined from receivers 22 is representative of the ambient light level, which may change during operation of turbomachine 12. Using the ambient light level, the light return amplitude data can be corrected or prior to determining a light amplitude difference in step 106. Accordingly, variances of the light amplitude data due to changes in ambient light amplitude can be reduced or eliminated.

Once controller determines a change in light amplitude associated with one or more of receivers 22, controller 24 compares each calculated light amplitude change to a damage criterion in step 114. For instance, the damage criterion can be a threshold amplitude change in one or more of back scatter light returns, forward scatter light returns, and side scatter light returns. The threshold amplitude change is selected to exceed a light amplitude variation due to signal noise. Where surfaces of blades 16 are initially smooth, the light return profile may include predominately forward light scatter associated with spectral reflection of the blade surface accompanied by a relatively small amount of back scatter and/or side scatter. Once blades 16 with smooth surfaces become damaged, the damaged region may produce a diffused reflection of light pulses characterized by increased back scatter light returns and/or side scatter light returns accompanied by decreased forward scatter light returns. Contrastingly, the surface roughness of some coated blades 16 can produce predominately diffuse reflectance in an undamaged state. Damage to such blades 16 may expose uncoated material. In this instance, damage to this blade can be detected by deviations from the baseline light returns, in which the backscatter, side scatter, and forward scatter light returns may be used to characterize the type of damage.

If damage detection algorithm 100 utilizes step 110, light returns can be evaluated on a rotation-to-rotation basis. For instance, the average forward scatter, side scatter, and back scatter light return for a given rotation can be compared to one or more subsequent rotations. Average light scatter values deviating from a previous average value by more than a threshold may indicate damage to one or more blades 16. In other embodiments, peaks and or troughs of a given rotation can be used to associate subregions of the light return profile with individual blades. In this instance, changes in forward scatter, back scatter, and or side scatter returns associated may indicate damage to a particular blade 16 of rotor 14.

If controller 24 determines that collected light returns satisfy any of the foregoing damage criteria, controller 24 may output an indication of blade damage in step 116. For instance, controller 24 may output a signal to an electric engine controller (EEC), a full authority digital engine controller (FADEC), or another peripheral system representative of damage to one or more blades 16 and, in some instance, damage to a particular blade 16. In some cases, a damage indication can be output to a display viewable by an operator. In aircraft applications, an indication of blade damage can be output to an avionics display in the cockpit of the aircraft.

Steps 102, 104, 106, 114, 116 and if included, steps 108, 110, and 112 repeat at a predetermined sampling rate. Accordingly, damage detection algorithm 100 inspects blades 16 of rotor 14 in situ and, outputs an indication of damage in real time.

Discussion of Possible Embodiments

The following are non-exclusive descriptions of possible embodiments of the present invention.

A system for detecting damage of a plurality of blades rotatable within a turbomachine includes, among other possible things, an emitter, a first receiver, and a controller. The emitter is orientated to emit a plurality of light pulses along an emission axis intersecting the plurality of blades. The first receiver has a first field of view intersecting the emission axis to define a first interrogation volume through which the plurality of blades rotates during operation of the turbomachine. The controller includes a processor and computer-readable memory in communication with the emitter and receiver. The computer-readable memory is encoded with instructions that, when executed by the processor, cause the system to emit the plurality of light pulses from the emitter toward the plurality of blades as the blades rotate within the turbomachine. The system receives a plurality of first light returns at the first receiver that have been scattered by the plurality of blades within the first interrogation volume. The system determines a first amplitude change of the plurality of first light returns and outputs an indication of damage to the blades based on the first amplitude change of the light returns.

The system of the preceding paragraph can optionally include, additionally and/or alternatively, any one or more of the following features, configurations and/or additional components A further embodiment of the foregoing system, wherein the first receiver can be collocated with the emitter to receive back scatter light returns.

A further embodiment of any of the foregoing system, wherein the controller can output the indication of damage based on a change in back scatter light return amplitude that exceeds a threshold light amplitude change.

A further embodiment of any of the foregoing systems, wherein the controller can output the indication of damage based on an increase in back scatter light return amplitude.

A further embodiment of any of the foregoing systems, wherein the controller can output the indication of damage based on a decrease in back scatter light return amplitude.

A further embodiment of any of the foregoing systems, wherein the first receiver can be spaced from the emitter to receive forward light scatter.

A further embodiment of any of the foregoing systems, wherein the controller can output an indication of damage based on an increase in forward scatter light return amplitude.

A further embodiment of any of the foregoing systems, wherein the controller can output an indication of damage based on a decrease in forward scatter light return amplitude.

A further embodiment of any of the foregoing system, wherein the controller can output the indication of damage based on a change in forward scatter light return amplitude that exceeds a threshold light amplitude change.

A further embodiment of any of the foregoing systems, wherein the first receiver can be spaced from the emitter to receive side scatter light returns.

A further embodiment of any of the foregoing systems, wherein the controller can output the indication of damage based on an increase in side scatter light return amplitude.

A further embodiment of any of the foregoing systems, wherein the controller can output the indication of damage based on a decrease in side scatter light return amplitude.

A further embodiment of any of the foregoing systems, wherein the controller can output the indication of damage based on a change of side scatter light amplitude that exceeds a threshold light amplitude change.

A further embodiment of any of the foregoing systems, wherein the computer-readable memory can be encoded with instructions that, when executed by the processor, cause the system to determine, by the controller, a first subset of light returns corresponding to a first rotation of the plurality of blades.

A further embodiment of any of the foregoing systems, wherein the computer-readable memory can be encoded with instructions that, when executed by the processor, cause the system to determine, by the controller, a second subset of light returns corresponding to a second rotation of the plurality of blades.

A further embodiment of any of the foregoing systems, wherein the indication of damage can be output by the controller based on a change in light return amplitude between the first rotation and the second rotation.

A further embodiment of any of the foregoing systems can include a second receiver having a second field of view intersecting the emission axis to define a second interrogation volume through which the plurality of blades rotates during operation of the turbomachine.

A further embodiment of any of the foregoing systems, wherein the computer-readable memory can be encoded with instructions that, when executed by the processor, cause the system to receive, at the second receiver, a plurality of second light returns scattered by the plurality of blades within the second interrogation volume.

A further embodiment of any of the foregoing systems, wherein the computer-readable memory can be encoded with instructions that, when executed by the processor, cause the system to determine, by the controller, a second amplitude change of the second light returns.

A further embodiment of any of the foregoing systems, wherein the indication of damage is output based on the first amplitude change and the second amplitude change.

A further embodiment of any of the foregoing systems, wherein the first receiver can be collocated with the emitter to receiver back scatter light returns.

A further embodiment of any of the foregoing systems, wherein the second receiver can be spaced from the emitter to receive forward scatter light returns.

A further embodiment of any of the foregoing systems, wherein the first amplitude change can indicate increased light amplitude of the plurality of first light returns.

A further embodiment of any of the foregoing systems, wherein the second amplitude change can indicate decreased light amplitude of the plurality of second light returns.

A further embodiment of any of the foregoing systems, wherein the computer-readable memory can be encoded with instructions that, when executed by the processor, cause the system to determine a rotational speed of the plurality of blades based on the plurality of first light returns.

A further embodiment of any of the foregoing systems, wherein the computer-readable memory can be encoded with instructions that, when executed by the processor, cause the system to receive, at the first receiver, an ambient light level.

A further embodiment of any of the foregoing systems, wherein the computer-readable memory can be encoded with instructions that, when executed by the processor, cause the system to determine, by the controller, at least one of a first amplitude change of the first light returns based on an amplitude of first light returns and the ambient light level.

A further embodiment of any of the foregoing systems, wherein the first emitter can include a lens.

A further embodiment of any of the foregoing systems, wherein the lens can include a rounded inlet surface that diverges outward along the emission axis and terminates at an outlet surface normal to the mission axis, and wherein each light pulse of the plurality of light pulses refracts to form a light line upon passing through the lens.

A further embodiment of any of the foregoing systems, wherein the computer-readable memory can be encoded with instructions that, when executed by the processor, cause the system to determine, by the controller, a first time of flight of the plurality of first light pulses.

A further embodiment of any of the foregoing systems, wherein the computer-readable memory can be encoded with instructions that, when executed by the processor, cause the system to identify, by the controller, a subset of the plurality of first light pulses based on a time-of-flight range.

A further embodiment of any of the foregoing systems, wherein the controller can determine the first amplitude change based on the subset of first light returns.

A further embodiment of any of the foregoing systems, wherein a frequency of the plurality of first light pulses can be at least three times a rotational frequency of the plurality of blades times a number of blades.

A method of detecting damage of a plurality of blades rotatable within a turbomachine includes, among other possible steps, emitting a plurality of light pulses from an emitter toward the plurality of blades as the blades rotate within the turbomachine. The method includes receiving, at a first receiver, a plurality of first light returns scattered by the plurality of blades and determining, by the controller, a first amplitude change of the first light returns. The method includes outputting, by a controller, an indication of damage based on the first amplitude change of the light returns.

The method of the preceding paragraph can optionally include, additionally and/or alternatively, any one or more of the following features, configurations, additional components, and/or steps.

A further embodiment of the foregoing method can include determining a first subset of light returns corresponding to a first rotation of the plurality of blades.

A further embodiment of any of the foregoing methods can include determining a second subset of light returns corresponding to a second rotation of the plurality of blades.

A further embodiment of any of the foregoing methods, wherein the indication of damage can be output based on a change in light return amplitude between the first rotation and the second rotation.

A further embodiment of any of the foregoing methods can include receiving a plurality of second light returns scattered by the plurality of blades.

A further embodiment of any of the foregoing methods can include determining at least one of a second amplitude change of the second light returns.

A further embodiment of any of the foregoing methods, wherein the indication of damage can be output based on the first amplitude change and a second amplitude change.

A further embodiment of any of the foregoing methods, wherein the first light returns can be back scatter light returns, and wherein the second light returns can be forward scatter light return.

A further embodiment of any of the foregoing methods, wherein the first amplitude change can indicate increased light amplitude of the plurality of first light returns and the second amplitude change can indicate decreased light amplitude of the plurality of second light returns.

A further embodiment of any of the foregoing methods can include receiving, at the first receiver, an ambient light level.

A further embodiment of any of the foregoing methods can include determining at least one of a first amplitude change of the first light returns based on an amplitude of first light returns and the ambient light level.

A further embodiment of any of the foregoing methods can include determining a first time of flight of the plurality of first light pulses.

A further embodiment of any of the foregoing methods can include identifying a subset of the plurality of first light pulses based on a time-of-flight range.

A further embodiment of any of the foregoing methods can include determining the first amplitude change based on the subset of first light returns.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbomachine comprising:
a plurality of blades rotatable about an axis of the turbomachine; and
a system for detecting damage of the plurality of blades, the system comprising:
an emitter mounted to the turbomachine and orientated to emit a plurality of light pulses along an emission axis intersecting the plurality of blades;
a first receiver mounted to the turbomachine that has a first field of view intersecting the emission axis to define a first interrogation volume through which the plurality of blades rotates during operation of the turbomachine, wherein the emitter and the first receiver are mounted to the turbomachine upstream from the plurality of blades relative to a direction of air flow through the plurality of blades during operation of the turbomachine; and
a controller in communication with the emitter and the first receiver, the controller comprising a processor and computer-readable memory encoded with instructions that, when executed by the processor, cause the system to:
emit the plurality of light pulses from the emitter toward the plurality of blades as the blades rotate within the turbomachine;
receive, at the first receiver, a plurality of first light returns scattered by the plurality of blades within the first interrogation volume;
receive, at the first receiver, an ambient light level;
determine, by the controller, a plurality of first times of flight of the plurality of first light returns;
identify, by the controller, a subset of the plurality of first light returns associated with the plurality of blades based on a time-of-flight range and the plurality of first times of flight;
determine, by the controller, a first amplitude change of the subset of the first light returns based on an amplitude of the first light returns and the ambient light level; and
output, by the controller, an indication of topographical damage to the blades based on a comparison between the first light amplitude change of the light returns and a threshold light amplitude change.

2. The turbomachine of claim 1, wherein the first receiver is collocated with the emitter to receive back scatter light returns, and wherein the controller outputs the indication of damage based on a change in backscatter light return amplitude and the threshold light amplitude change.

3. The turbomachine of claim 1, wherein the first receiver is spaced from the emitter to receive forward light scatter, and wherein the controller outputs the indication of damage based on a change in forward scatter light return amplitude and the threshold light amplitude change.

4. The turbomachine of claim 1, wherein the first receiver is spaced from the emitter to receive side scatter light returns, and wherein the controller outputs the indication of damage based on a change of side scatter light amplitude and the threshold light amplitude change.

5. The turbomachine of claim 1, wherein the computer-readable memory is encoded with instructions that, when executed by the processor, cause the system to:
determine, by the controller, a first subset of light returns corresponding to a plurality of first rotations of the plurality of blades; and
determine, by the controller, a second subset of light returns corresponding to a plurality of second rotations of the plurality of blades;
wherein the indication of damage is output by the controller based on a change in light return amplitude between the plurality of first rotations and the plurality of second rotations.

6. The turbomachine of claim 1, wherein the computer-readable memory is encoded with instructions that, when executed by the processor, cause the system to:
determine a rotational speed of the plurality of blades based on the plurality of first light returns.

7. The turbomachine of claim 1, wherein the first emitter includes a lens, the lens comprising a rounded inlet surface that diverges outward along the emission axis and terminates at an outlet surface normal to the emission axis, and wherein each light pulse of the plurality of light pulses refracts to form a light line upon passing through the lens.

8. The turbomachine of claim 1, wherein a frequency of the plurality of first light pulses is greater than a rotational frequency of the plurality of blades times a number of blades.

9. A turbomachine comprising:
a plurality of blades rotatable about an axis of the turbomachine; and
a system for detecting damage of the plurality of blades, the system comprising:
an emitter mounted to the turbomachine and orientated to emit a plurality of light pulses along an emission axis intersecting the plurality of blades;
a first receiver mounted to the turbomachine that has a first field of view intersecting the emission axis to define a first interrogation volume through which the plurality of blades rotates during operation of the turbomachine;
a second receiver mounted to the turbomachine that has a second field of view intersecting the emission axis to define a second interrogation volume through which the plurality of blades rotates during operation of the turbomachine, wherein the emitter, the first receiver, and the second receiver are mounted to the turbomachine upstream from the plurality of blades relative to a direction of air flow through the plurality of blades during operation of the turbomachine; and
a controller in communication with the emitter, the first receiver, and the second receiver, the controller comprising a processor and computer-readable memory encoded with instructions that, when executed by the processor, cause the system to:
emit the plurality of light pulses from the emitter toward the plurality of blades as the blades rotate within the turbomachine;
receive, at the first receiver, a plurality of first light returns scattered by the plurality of blades within the first interrogation volume;
receive, at the second receiver, a plurality of second light returns scattered by the plurality of blades within the second interrogation volume;
receive, at the first receiver, an ambient light level;
determine, by the controller, a plurality of first times of flight of the plurality of first light returns;

identify, by the controller, a subset of the plurality of first light returns associated with the plurality of blades based on a time-of-flight range and the plurality of first times of flight;

determine, by the controller, a first amplitude change of the first light returns based on an amplitude of the subset of first light returns and the ambient light level;

determine, by the controller, a plurality of second times of flight of the plurality of second light returns;

identify, by the controller, a subset of the plurality of second light returns associated with the plurality of blades based on the time-of-flight range and the plurality of second times of flight;

determine, by the controller, a second amplitude change of the second light returns based on an amplitude of the subset of second light returns and the ambient light level; and output, by the controller, an indication of topographical damage to the blades based on a comparison of the first light amplitude change of the light returns and a first threshold light amplitude change and a second comparison between the second amplitude change of light returns and a second threshold light amplitude change.

10. The turbomachine of claim 9, wherein the first receiver is collocated with the emitter to receive back scatter light returns, and wherein the second receiver is spaced from the emitter to receive forward scatter light returns or side scatter light returns.

11. The turbomachine of claim 10, wherein the first amplitude change exceeds the first threshold light amplitude change of the plurality of first light returns and the second amplitude exceeds the second threshold light amplitude change of the plurality of second light returns.

12. The turbomachine of claim 11, wherein the first amplitude change is indicative of an increase in backscatter light returns, and wherein the second amplitude change is indicative of a decrease in forward scatter light returns or side scatter light returns.

13. The turbomachine of claim 9, wherein the emitter, the first receiver, and the second receiver are mounted to a surface of the turbomachine surrounding and facing the plurality of blades, and wherein the emitter, the first receive, and the second receiver are circumferentially spaced about a rotational axis of the plurality of blades along the surface.

14. A method of detecting damage of a plurality of blades rotatable within a turbomachine, the method comprising:

emitting a plurality of light pulses from an emitter toward the plurality of blades as the blades rotate within the turbomachine;

receiving, at a first receiver, a plurality of first light returns scattered by the plurality of blades, wherein the emitter and the first receiver are mounted to the turbomachine upstream from the plurality of blades relative to a direction of air flow through the plurality of blades during operation of the turbomachine;

receiving, at the first receiver, an ambient light level;

determining, by the controller, a plurality of first times of flight of the plurality of first light returns;

identifying, by the controller, a subset of the plurality of first light returns associated with the plurality of blades based on a time-of-flight range and the plurality of first times of flight;

determining, by the controller, a first amplitude change of the first light returns based on an amplitude of the subset of first light returns and the ambient light level; and outputting, by a controller, an indication of topographical damage based on a comparison between the first amplitude change of the light returns and a first threshold light amplitude change.

15. The method of claim 14, further comprising:

determining, by the controller, the first subset of light returns corresponding to a plurality of first rotations of the plurality of blades; and determining, by the controller, a second subset of light returns corresponding to a plurality of second rotations of the plurality of blades;

wherein the indication of topographical damage is output by the controller based on a change in light return amplitude between the plurality of first rotations and the plurality of second rotations.

16. The method of claim 14, further comprising:

receiving, at the second receiver, a plurality of second light returns scattered by the plurality of blades; and determining, by the controller, a second amplitude change of the second light returns;

wherein the indication of topographical damage is output based on the comparison between the first amplitude change and the first threshold light amplitude change and a second comparison between the second amplitude change and a second threshold light amplitude change.

17. The method of claim 16, wherein the first light returns are back scatter light returns and wherein the second light returns are forward scatter light returns.

18. The method of claim 17, wherein the first amplitude change is indicative of an increase in back scatter light returns that exceed a first threshold light amplitude change of the plurality of first light returns and the second amplitude change is indicative of a decrease in forward light scatter returns that exceed a second threshold light amplitude change of the plurality of second light returns.

* * * * *